US005626669A

United States Patent [19]
Burg

[11] Patent Number: 5,626,669
[45] Date of Patent: May 6, 1997

[54] HIGH EFFICIENCY MARINE VEHICLE

[75] Inventor: Donald E. Burg, Miami, Fla.

[73] Assignee: Paulette Renee Burg, Miami, Fla.

[21] Appl. No.: 483,791

[22] Filed: Jun. 7, 1995

Related U.S. Application Data

[63] Continuation-in-part of Ser. No. 737,403, Nov. 1, 1976, abandoned, Ser. No. 818,303, Jul. 25, 1977, Pat. No. 4,165,703, Ser. No. 69,771, Aug. 27, 1979, abandoned, Ser. No. 207,789, Nov. 17, 1980, abandoned, Ser. No. 269,908, Jun. 3, 1981, Pat. No. 4,392,445, Ser. No. 289,769, Aug. 3, 1981, abandoned, Ser. No. 343,287, Jan. 27, 1982, abandoned, Ser. No. 458,738, Jan. 17, 1983, abandoned, Ser. No. 465,670, Feb. 10, 1983, abandoned, Ser. No. 584,728, Feb. 29, 1984, Pat. No. 4,587,918, Ser. No. 844,529, Mar. 27, 1986, Pat. No. 4,735,164, Ser. No. 862,300, May 12, 1986, Pat. No. 4,739,719, Ser. No. 183,588, Apr. 19, 1988, Pat. No. 4,890,564, Ser. No. 458,575, Dec. 29, 1989, Pat. No. 5,000,107, Ser. No. 653,724, Feb. 11, 1991, abandoned, Ser. No. 728,887, Jul. 10, 1991, Pat. No. 5,176,095, Ser. No. 871,387, Apr. 21, 1992, abandoned, Ser. No. 151,253, Nov. 12, 1993, Pat. No. 5,415,120, Ser. No. 283,647, Aug. 1, 1994, abandoned, Ser. No. 347,859, Dec. 1, 1994, abandoned, and Ser. No. 468,876, Jun. 6, 1995.

[51] Int. Cl.$^6$ ............................. B63B 1/30; B63B 1/38
[52] U.S. Cl. ................. 114/67 A; 114/273; 114/282
[58] Field of Search ..................... 114/67 A, 272, 114/273, 280, 282, 283, 291, 121, 122; 244/106

[56] References Cited

U.S. PATENT DOCUMENTS

| | | | |
|---|---|---|---|
| 2,343,645 | 3/1944 | Dickinson et al. | 244/106 |
| 2,988,035 | 6/1961 | Gram | 114/67 A |
| 3,476,069 | 11/1969 | Mantle et al. | 114/67 A |
| 3,518,956 | 7/1970 | Girodin | 114/67 A |
| 3,804,049 | 4/1974 | Greer | 114/273 |
| 3,968,762 | 7/1976 | Meyer, Jr. | 114/67 A |

FOREIGN PATENT DOCUMENTS

| | | | |
|---|---|---|---|
| 2844 | 2/1904 | United Kingdom | 114/273 |

*Primary Examiner*—Sherman Basinger
*Attorney, Agent, or Firm*—Robert J. Van Der Wall

[57] ABSTRACT

An improved pressurized gas supported marine vehicle that is, in its preferred embodiment long and slender and stabilized by outrigger hulls, is presented. This vehicle, known as SeaLance because of its optimal very fine entry bow and narrow fine main hull, is also capable of airborne operation when equipped with sidewings. When waterborne, an artificially pressurized gas cushion is disposed in an open bottomed recess in the main hull. First and second, forward and aft, air cushions can be used to maintain a higher gas cushion pressure aft than forward which reduces water blowout at the bow and to aid in trimming of the vehicle. Further, labyrinth seals can be disposed on recess intermediate and aft seals to aid in sealing of gas flow. An optional feature of SeaLance is one or more water stabilizers that can include hydrofoils and/or a small lifting body. The water stabilizer(s) would normally retract into an open bottomed recess in the main hull when not used. The sidewings can be built to be fixed or retractable and, further, can include winglets that can further include wingcaps to improve aerodynamic efficiencies. It is possible to seal the main blower(s) such that a small gas pump can be used to then either maintain cushion pressure for extended periods while dockside or evacuate gas from the cushion to put an air cushion vessel into a semi-submerged state. The latter semi-submerged state is valuable for patrol craft that desire a minimum radar signature when at rest on station. Once such a SeaLance patrol craft has spotted the enemy, it can crank up its main blowers and, optimally, go into a very high speed wing in ground effect mode to make capture.

21 Claims, 6 Drawing Sheets

HIGH EFFICIENCY MARINE VEHICLE

CROSS REFERENCE TO OTHER APPLICATIONS

This application is a continuation-in-part to applicant's earlier application, Ser. No. 737,403 filed Nov. 1, 1976, now abandoned; Ser. No. 818,303 filed Jul. 25, 1977, now U.S. Pat. No. 4,165,703 issued Aug. 28, 1979; Ser. No. 069,771 filed Aug. 27, 1979, now abandoned; Ser. No. 207,789 filed Nov. 17, 1980, now abandoned; Ser. No. 269,908 filed Jun. 3, 1981, now U.S. Pat. No. 4,392,445 issued Jul. 12, 1983; Ser. No. 289,769 filed Aug. 3, 1981, now abandoned; Ser. No. 343,287 filed Jan. 27, 1982, now abandoned; Ser. No. 458,738 filed Jan. 17, 1983, now abandoned; Ser. No. 465,670 filed Feb. 10, 1983, now abandoned; Ser. No. 584,728 filed Feb. 29, 1984, now U.S. Pat. No. 4,587,918 issued May 13, 1986; Ser. No. 844,529 filed Mar. 27, 1986, now U.S. Pat. No. 4,735,164 issued Apr. 5, 1988; Ser. No. 862,300 filed May. 12, 1986, now U.S. Pat. No. 4,739,719 issued Apr. 26, 1988; Ser. No. 183,588 filed Apr. 19, 1988, now U.S. Pat. No. 4,890,564 issued Jan. 2, 1990; Ser. No. 458,575 filed Dec. 29, 1989, now U.S. pat. No. 5,000,107 issued Mar. 19, 1991; Ser. No. 653,724 filed Feb. 11, 1991 now abandoned; Ser. No. 728,887 filed Jul. 10, 1991, now U.S. Pat. No. 5,176,095 issued Jan. 5, 1993; Ser. No. 871,387 filed Apr. 21, 1992 now abandoned; Ser. No. 151,253 filed Nov. 12, 1993, now U.S. Pat. No. 5,415,120 issued May 16, 1995; Ser. No. 283,647 filed Aug. 1, 1994; now abandoned, Ser. No. 347,859 filed Dec. 1, 1994 now abandoned; and Ser. No. 468,876 filed Jun. 6, 1995.

FIELD OF THE INVENTION

The instant invention describes marine vehicles that operate in a surface effect condition by entrapping a cushion(s) of artifically pressurized gas between the vehicle and a water surface and/or a ram effect of ambient air that is sandwiched between the vehicle and a water or other surface at higher vehicle speeds. The first are most commonly called hovercraft or Surface Effect Ships (SES's) and the latter Wing in Ground Effect (WIG), Wing in Surface Effect Craft, or simply wingships. The common thread of all of these vehicles is that the pressurized gas disposed between the vehicle and the supporting medium carries much of vehicle weight. In any case, overall efficiencies of the SES are much greater than conventional marine vehicles and overall efficiencies of the WIG are much greater than commercial aircraft.

Applicant's earlier developments of marine vehicles using artificially pressurized supporting gas cushions have been successful and have resulted in a number of vehicles being built. The most promising concept that is just now close to production status is called SeaCoaster. SeaCoaster is, in its preferred embodiment, a catamaran with open bottomed recesses in each catamaran sidehull with said recesses artifically pressurized with gas. The gas cushions thus formed support some 85–90 percent of vehicle weight when waterborne. SeaCoaster is described briefly in an article on page 35 in the May 1992 issue of "Ship & Boat International" magazine in an article titled "A no-skirts SES hybrid". SeaCoaster offers a very stable, due to its widely spaced sidehulls, and heavy load carrying vehicle; however, there are certain applications where a very long and fine single hull offers unique advantages.

Applicant therefore proposes a very fine long and thin gas cushion supported marine hull. Because of it normal very fine entry wave slicing bow, it is referred to as SeaLance. SeaLance's high Length to Beam (L/B) gas cushions have virtually no takeoff or "Hump" drag characteristic. As such, very large SeaLance vehicles can cruise with very low power requirements in what would have been a very high drag "Hump" condition for a standard low L/B SES. SeaCoaster, although having less "Hump" drag than the low L/B SES still has more than SeaLance in such condition. The fact that SeaLance has a very fine entry bow makes for an exceptionally good riding vehicle in rough seas.

SeaLance's fine entry bows are made possible by use of very low divergence sidehull keels on either side of its gas cushion(s). Other prior art signal air cushion cannot do this because of related instabilities. The shortcoming of a high L/B air cushion craft, such as a high L/B SES, is that they are lacking in roll stability due to their narrow beams. SeaLance resolves this by use of outrigger hulls. Outrigger hulls are not new in concept and have been used by south Pacific islanders for many years. However, their application to the open bottomed recess very unstable air cushioned SeaLance concept is unique and totally new. SeaLance, as conceived with its very fine entry and long and slender gas cushion(s), could basically roll over in rough seas when its gas cushion(s) is pressurized were it not for its outrigger hulls.

Several attachment means for outrigger hulls on SeaLance are given herein. These include: fixed structure, hinged to rotate aft of the vessel when off-cushion, hinged to rotate below the vessel when off-cushion, or hinged to rotate above the vessel when off-cushion. Note that the outrigger hulls would normally be locked in an extended position to each side of the main air cushioned hull when on-cushion. Other connection systems than hinges can also be used to connect sidewings.

An immediate application of SeaLance as a waterborne vehicle that comes to mind is as a small patrol craft where seaworthiness and stealth are prime considerations. Its long fine entry bow insures ultimate seakeeping abilities while an optional feature allows minimum air draft and hence minimum radar signature when laying in wait for smugglers, etc. The latter feature is accomplished by a gas pump that evacuates all gas from SeaLance's gas cushions and thereby sucks it down very low in the water into a semi-submerged condition. When the enemy is seen, the evacuating gas pump is turned off and the main cushion blower(s) powered up and the chase is on.

Another waterborne application of SeaLance is as a large military combatant, large freighters, liners, or any large ship that would operate at relatively low speed/length ratios. The power to drive such a craft is expected to be only about half of that of today's comparable vessels due, of course, to the water friction reducing gas cushion of SeaLance.

It is also possible to have SeaLance translate to an airborne mode at high operational speeds. This would normally occur at very high waterborne speeds near the 70–100 knots area. Outrigger hull wings, and possibly additional winglets, provide the added aerodynamic lift for airborne operation of SeaLance. Note that for purposes of this application high speed waterborne operation is defined as being over 15 knots.

The airborne capability adds another new dimension to patrol craft. A patrol craft SeaLance can lie in wait with its air cushion(s) evacuated in the aforementioned semi-submerged stealth condition. Its main blowers are then energized and it pops up to chase down the enemy. It can now also become airborne for very high speed chase or other applications. Of course, the high speed airborne abilities of SeaLance are not limited to small patrol craft and applications for very large WIG SeaLance craft abound. Some other application are as large transoceanic passenger liners and troop carriers where high over water speeds and low cost per passenger mile are important. Another is as a crew and critical part supplier to offshore oil rigs where the ability to land alongside an offshore rig is necessary. SeaLance all of the aforementioned features and more, including rough water stabilizers, while being simple and low in cost to manufacture and maintain.

The instant SeaLance invention offers advancements over applicant's earlier inventions as well as over the prior art. These advancements are discussed in some detail in the following sections.

SUMMARY OF THE INVENTION

The principal object of the instant invention is provide a superior marine vehicle that is primarily supported by pressurized gas.

It is a directly related object of the invention that the pressurized gas can be supplied by artificial means when the marine vehicle is in a waterborne mode and by ambient air when in an airborne mode.

It is another object of the invention that a main hull of the marine vehicle shall have an open bottomed recess for containing part of an artifically pressurized gas cushion when waterborne.

A directly related object of the invention is that such open bottomed recess be, at least partially bounded by sidekeels.

It is a directly related object of the invention that sidekeels diverge going aft from a bow.

Another related object of the invention is that a total divergence angle of said sidekeels be no more than 22 degrees.

As a further direct refinement of the preceding, it is optional limitation of the invention that the sidekeels total divergence angle be no more than 18 degrees.

It is a further related object of the invention that divergence of the sidekeels be substantially symmetrical about a vertical centerline plane of a main hull.

A related object of the invention is that the sidekeels become more parallel going aft after diverging.

It is yet another related object of the invention that sidekeel divergence occurs over at least one third of a waterline length of the main hull.

Yet another object of the invention is that the main hull when waterborne, as seen in a calm sea waterline with its gas cushion(s) pressurized and traveling forward at high speed, is substantially boat shaped a narrow bow transitioning to more parallel sections.

It is another object of the invention that a recess aft seal be utilized to restrict gas leakage from an aft end of the recess.

Another object of the invention is that the marine vehicle can contain a forwardly extending wave slicing lower bow that is referred to as a SeaSaber bow.

It is a related object of the invention that said open bottomed recess can contain two, noted as first and second recesses, or more smaller recesses.

It is a further related object of the invention that the smaller recesses can be separated by a recess intermediate seal member.

It is a directly related object of the invention that a first and second open bottomed recess can be maintained at different pressures with the forward, first recess, at the lower pressure to reduce blowout of water from the bow area.

Yet another object of the invention is that labyrinth seals can be disposed on lower surfaces of recess intermediate and/or recess aft seal members.

It is also an object of the invention that recess intermediate and/or aft seals preferably be, as seen in a vertical transverse plane of the main hull, angled to horizontal over a majority of their width.

It is a directly related object of the invention that the recess intermediate and/or aft seals have, at least in part, and inverted-V shape.

It is another object of the invention that sealing means, that seal at least 90 percent of gas leakage, can be utilized to stop gas flow through the main gas cushion pressurizing blowers.

A directly related object of the invention is that a gas pump and valve system can be used to either maintain pressure in the gas cushion recess(es) or evacuate gas from the gas cushion recess(es).

It is a related object of the invention that outrigger hulls can be utilized either side of the main hull to aid in stability.

It is a directly related object of the invention that said outrigger hulls can be either fixed or retractable.

It is another directly related object of the invention that retraction of outrigger hulls can be up and/or down or forward and/or aft.

It is a related object of the invention that winglets can also be applied to aid in aerodynamic lift.

It is a directly related object of the invention that wingcaps can be applied to winglets to further improve aerodynamic efficiencies.

It is yet another object of the invention that sidewings can be applied to the main hull.

It is an object of the invention that the marine vehicle is capable of airborne operation by takeoff from a water surface.

It is a related object of the invention that propulsion can be either water or air propulsors or a combination of both.

Another feature of the invention is the application of a water stabilizer(s) were said water stabilizer can include a hydrofoil and/or a small lifting hull member.

It is a directly related object of the invention that a water stabilizer can retract into a gas cushion recess of the main hull.

It is another object of the invention that vertical water deflecting sidesteps can be located in sidewalls of the main hull.

A directly related object of the invention is that such sidesteps include chines were said chines start vertically high at a front portion of the sidestep and then swoop down to proximal a height of a chine disposed forward of said sidestep.

The invention will become better understood upon reference to the drawings and the detailed description of the invention which follow in which:

BRIEF DESCRIPTION OF THE DRAWINGS

FIG's. 8, 9, and 10 show cross sections of the main hull, as taken through lines 8—8, 9—9, and 10—10 of FIG. 2.

DETAILED DESCRIPTION

Figure 1:
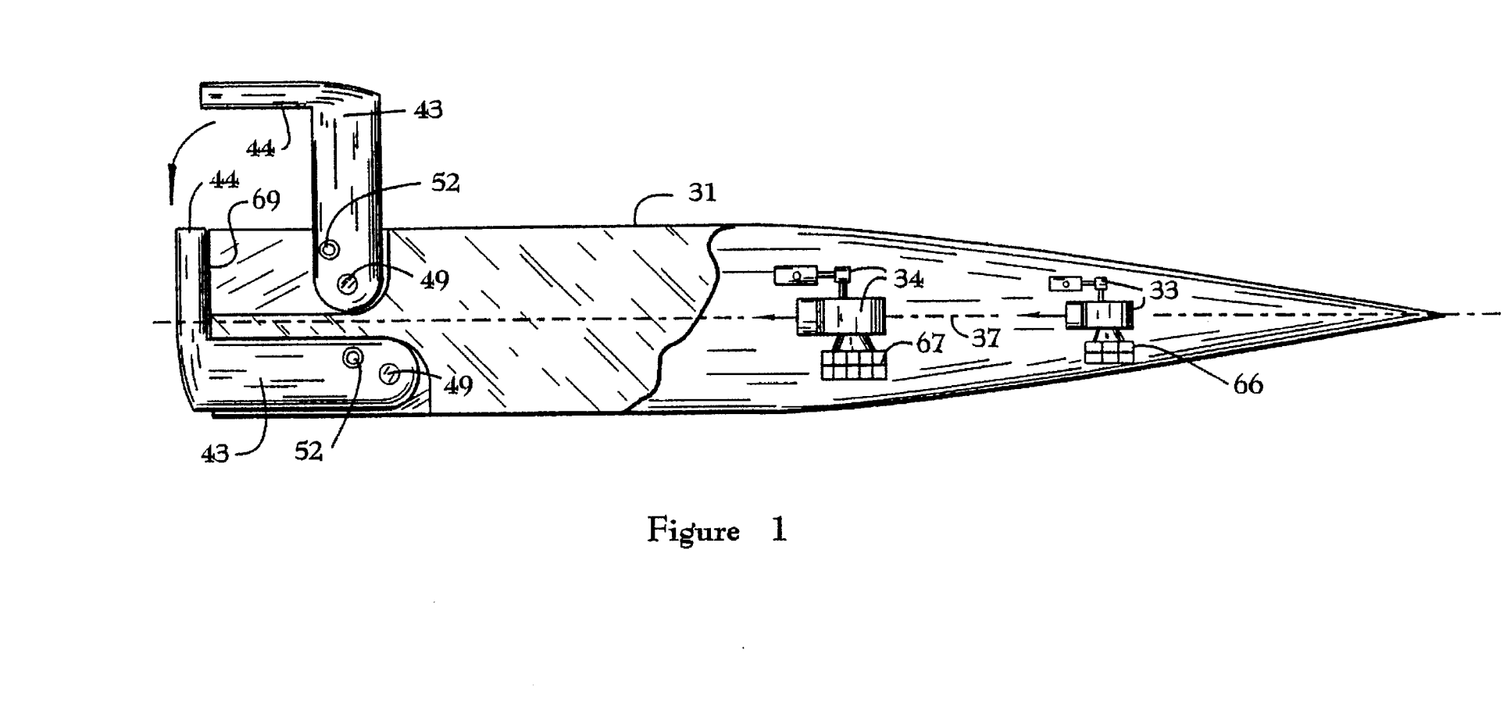
FIG. 1 presents a top plan view of the inventive SeaLance hull showing a port outrigger hull extended into position and a starboard outrigger hull retracted behind the main hull. In this depiction, part of the forward deck is removed showing first and second blower assemblies.

FIG. 1 represents a top plan view of the inventive SeaLance showing main hull 31, outrigger hull 44, outrigger wings 43, hinge pins 49, locking pins 52, and a main hull vertical centerline plane 37. Note that the port outrigger hull is locked in its usable or extended position and the starboard outrigger hull is stored aft of a transom 69 in this illustration. Also shown, with a forward portion of the top deck removed, are a first blower assembly 33 and its first gas inlet 66 and a second blower assembly 34 and its second gas inlet 67.

Figure 2:
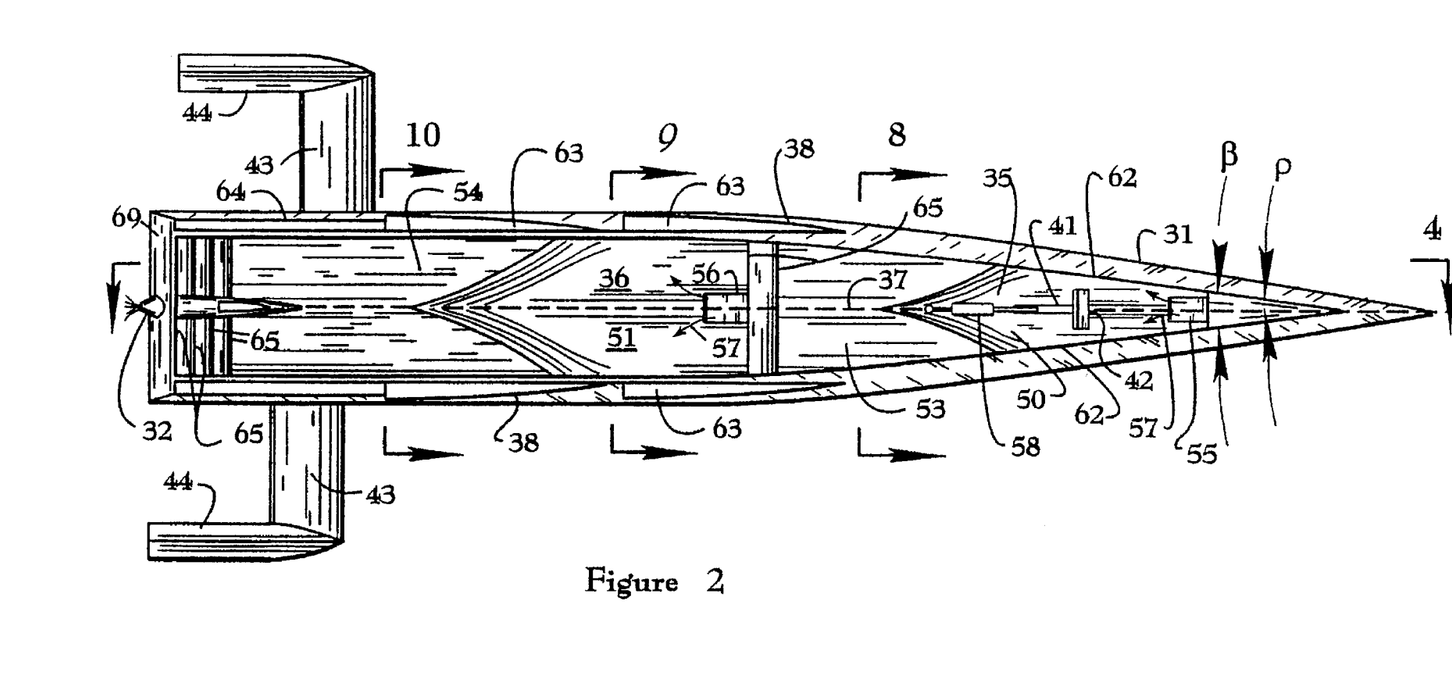
FIG. 2 is a bottom plan view of the same SeaLance configuration as presented in FIG. 1 but with both outrigger hulls extended.

FIG. 2 is a bottom plan view of the same SeaLance but with both port and starboard outriggers extended for normal operation. Note the very fine pointed bow of the main hull 31. It has been established in tests by applicant of waterborne SeaCoaster hulls that a total divergence angle ($\beta$) of sidekeels 62, as seen in a calm sea surface waterline with gas cushion(s) 50, 51 pressurized and the SeaLance traveling forward at high speeds, should be less than 22 degrees for good seakeeping qualities. Actually a total divergence angle ($\beta$) of less than 18 degrees is even better. A partial angle ($\rho$) is noted as occurring either side of a vertical centerline plane 37 of the main hull. The best design situation occurs when sidekeel divergence is substantially symmetrical about said vertical centerline plane 37.

Some discussion is now in order regarding the relevance of the proper divergence angle ($\beta$) of the gas cushion from the narrow bow going aft to where the substantially rigid sidekeels bounding a recess in a hull become move parallel. This angle is referred to as the total divergence angle ($\beta$) of the sidekeels. First, a rectangular gas cushion with a squared off front end and substantially parallel sidekeels will actually be the most efficient in calm seas as that configuration has the largest gas cushion area and hence the lowest most efficient gas cushion pressure, the bow seal will actually be clear of the water at high speed resulting in minimum bow seal drag, and the sidekeels will be parallel over their entire length which is a least drag situation. However, such squared off bow seal designs have very poor rough sea performance. Tests have been conducted on Applicant's narrow pointed bow designs with reduced sidekeels total divergence angles. Bow movement or pitching in rough seas starts to fall into an acceptable range at just under 22 degrees total divergence angle ($\beta$). It is a compromise as to how far to lower the total divergence angle and still have sufficient gas cushion area to properly support the vessel. Tests with a sidekeels divergence angle ($\beta$) of just under 18 degrees showed a good compromise between rough sea ride qualities and sufficient cushion area. Therefore, the necessary limits of sidekeels divergence angle ($\beta$) for the instant invention are less then 22 degrees with less than 18 degrees preferred.

Also shown in FIG. 2 are first open bottomed recess 35, first pressurized gas cushion 50, second open bottomed recess 36, second pressurized gas cushion 51, recess first or intermediate seal 53 and recess aft seal 54. Note the use of labyrinth seals 65 inset into each of the just mentioned recess intermediate and aft seals. Further shown are main hull chines 38, sidesteps 63, sideinsets 64, first blower discharge opening 55, second blower discharge opening 56, air flow arrows 57, and water propulsor 32. Additionally, a water stabilizer 41 which includes a hydrofoil 42 is shown retracted into first recess 35 as is powered by actuator 58.

Figure 3:
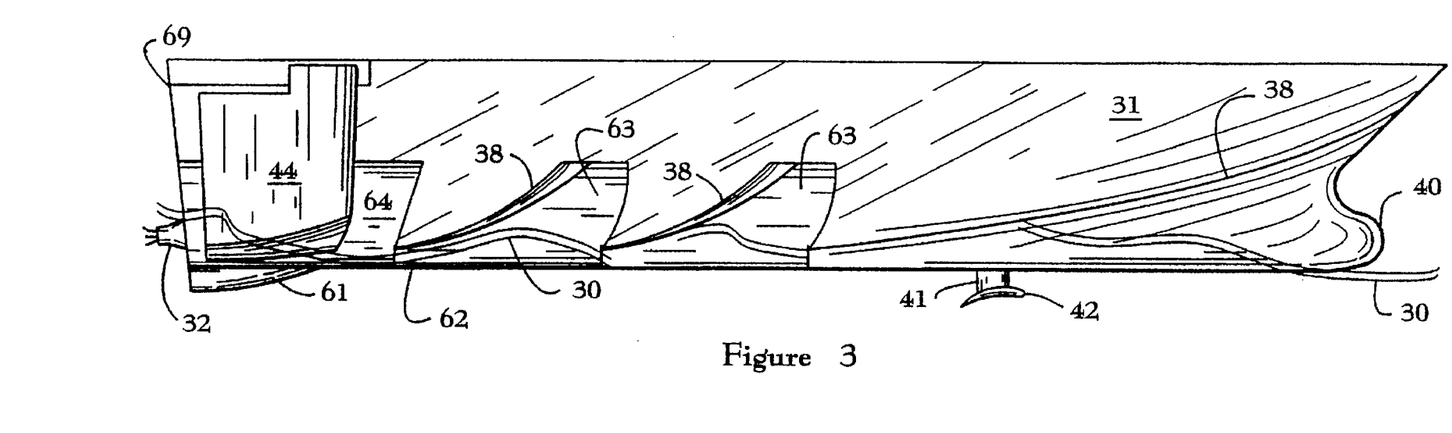
FIG. 3 is a profile view of the SeaLance of FIG. 2.

FIG. 3 is a starboard side profile view of a main hull 31 that also shows an outrigger hull 44 in its extended position. Note that the water contacting portion of outrigger hull 44 is preferably at a significantly higher elevation than the the sidehull keels 62 of the main hull to reduce outrigger hull water drag forces. Water line 30 gives some idea of how water is deflected from the main hull sides. Chines 38 swoop down from forward to aft in way of the sidesteps 63 to proximal an elevation of a chine preceding such sidestep in the preferred embodiment. Also shown is a SeaSaber forwardly extending wave slicing bow 40.

Figure 4:
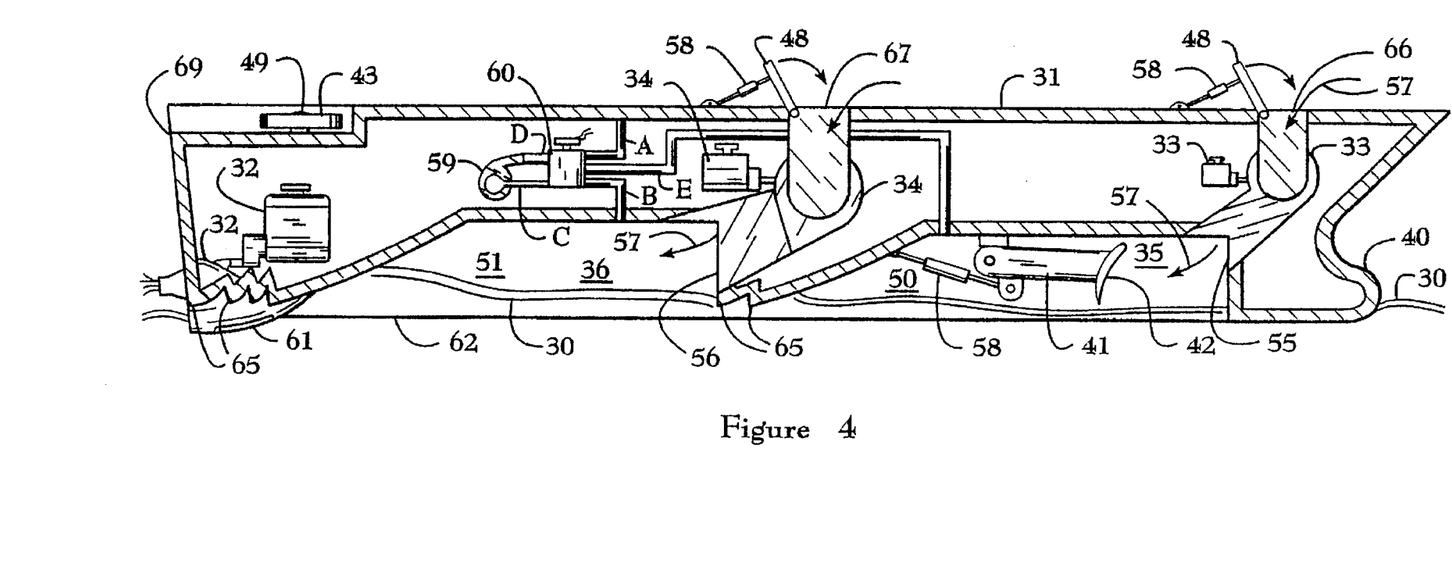
FIG. 4 is a cross sectional view, as taken through line 4—4 of FIG. 2, the show blowers, gas cushion recesses, retracted water stabilizer, and other details.

FIG. 4 is a cross sectional view, as taken through line 4—4 of FIG. 2, that shows first blower assembly 55 and second blower assembly and sealing means 48 that can be closed to effect sealing of blower passages. Note that a sealing of at least 90 percent is expected from such sealing means 48. Actuators 58 are also shown. A gas pump 59 and valve 60 is utilized in a unique system that can either maintain gas cushions pressurized at dockside or evacuate gas cushions and thereby semi-submerge the main hull. Function of this gas pump and valve are as follows: 1) To maintain pressure, A is open to C and D is open to B and E; 2) To evacuate the gas cushions, B and E are open to C and D is open to A.

Other things to note in FIG. 4 are a waterjet inlet 61 for the waterborne propulsor 32, the retracted into first gas cushion water stabilizer 41 which in this case comprises a hydrofoil 42, and labyrinth seals 65. It is important to note that a first gas cushion 50 can be at considerably lower pressure than a second gas cushion 51. This is particularly important for very large SeaLance marine vehicles since, on a 750 foot SeaLance for example, a transom depth of about 14 feet is quite possible which calls for very high pressures in the second gas cushion. Those high pressures would cause an excessive amount of "blow-out" of water around the first gas cushion so therefore the reason for differential pressures.

The labyrinth seals also primarily needed for the very large SeaLance since such very high cushion pressures in the second gas cushion would call for extremely high blower powers. The labyrinth seals greatly reduce the required blower power levels. Note that either only one or more than the two gas cushions and recess shown can be utilized if necessary in a particular application.

Figure 5:
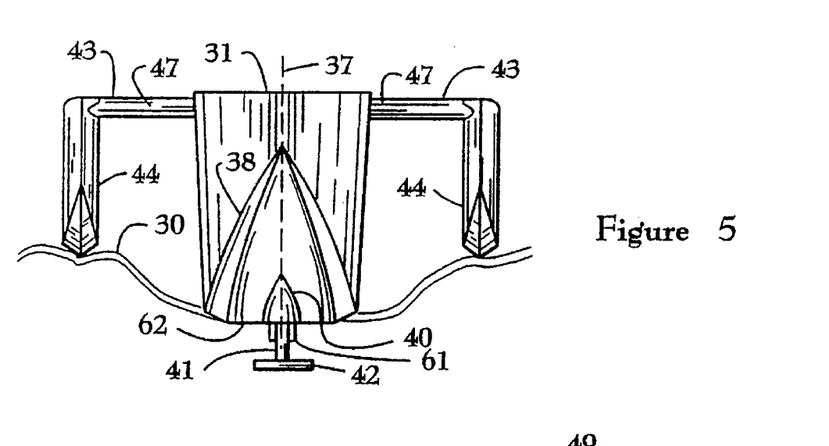
FIG. 5 presents a bow view of SeaLance with outriggers in place.

FIG. 5 presents a bow view of a waterborne SeaLance with its outrigger hulls 44 locked into position for maximum roll stability.

Figures 6, 7:
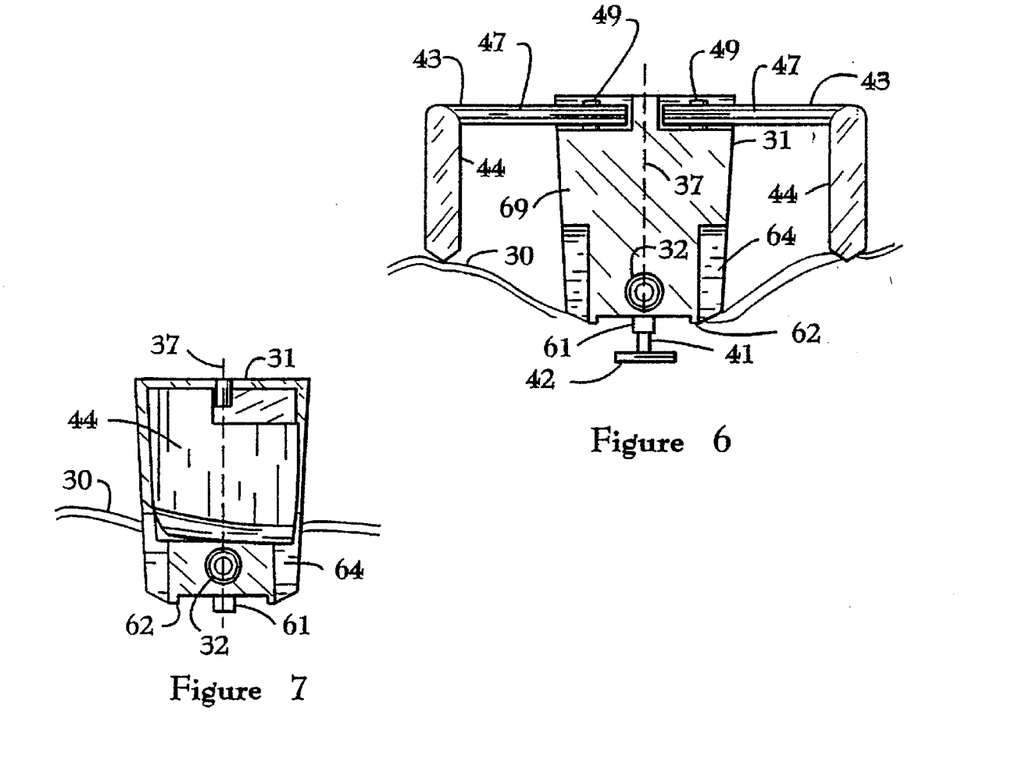
FIG. 6 is a stern view of the same SeaLance as presented in FIG. 5.
FIG. 7 is a stern view of the same SeaLance as shown in FIG.'s 5 and 6 but with its outrigger hulls retracted behind a transom of the main hull. Note that in this instance the gas cushion is not pressurized and therefore the main hull is lower in the water to add to main hull stability since the outriggers are not effective here.

FIG. 6 is a stern view of the same SeaLance as presented in FIG. 5. Note that the outrigger hulls are much higher than the main hull 31 and riding on a bow wave from the main hull here.

FIG. 7 is another stern view of the same SeaLance as shown in FIG.'s 1 through 6 but with the outrigger hulls retracted behind the transom for docking. Note that the gas cushions are evacuated here as is shown by the high waterline 30. It is generally considered best to have gas cushions not pressurized when the outrigger hulls are retracted for adequate stability.

Figure 8:
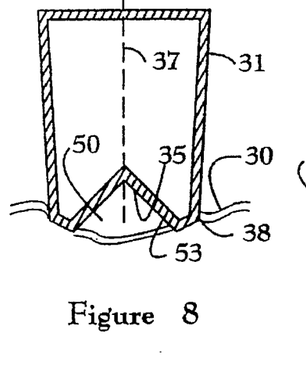

FIG. 8 is a cross section, as taken through a vertical transverse plane of the main hull noted by line 8—8 in FIG. 2, that shows preferred inverted-V shape of the first or intermediate seal 53. The preferred embodiment of seals of this invention is to have, as seen in a vertical transverse plane of the hull, surfaces angled to horizontal over a majority of their width for best ride qualities in rough seas.

Figure 9:
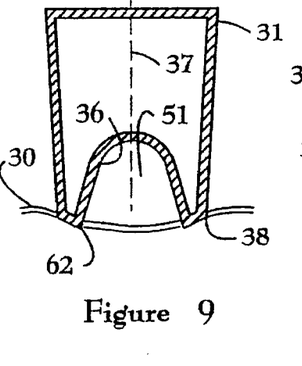

FIG. 9 is a cross section, as taken though line 9—9 of FIG. 2, that shows preferred shape of an open bottomed recess 36.

Figure 10:
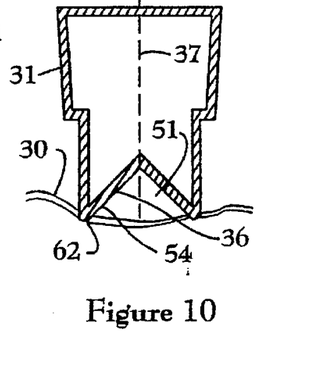

FIG. 10 is a cross section, as taken through line 10—10 of FIG. 2, that shows a preferred inverted-V shape of a recess aft seal.

Figures 11, 12:
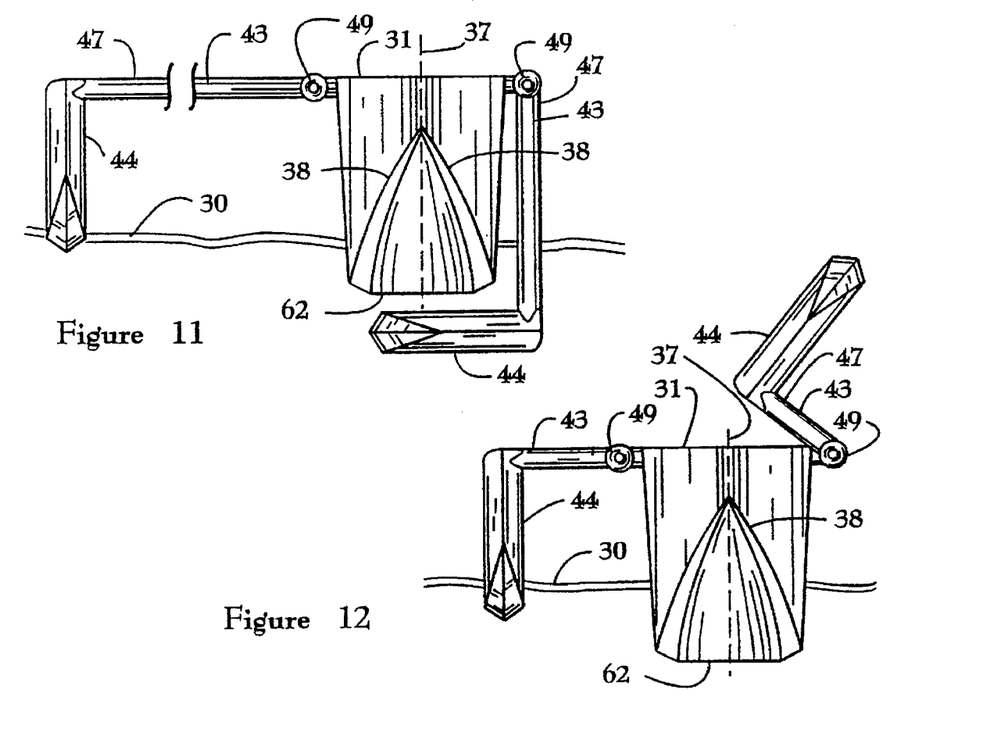
FIG. 11 is a bow view of another arrangement of SeaLance showing an alternative outrigger wing attachment arrangement. In this instance the starboard outrigger wing is in place to add stability and the port retracted or folded to below the main hull.
FIG. 12 is a bow view of a similar SeaLance as shown in FIG. 11 but with the port outrigger wing folded upward.

FIG. 11 presents a bow view of a SeaLance that illustrates retractable outrigger wings 43 that can fold downward below the hull to minimize beam. This is normally accomplished using hinges 49 or other mechanical folding means, not shown.

FIG. 12 is a bow view of a similar SeaLance as presented in FIG. 11 shows outrigger wings 43 folded in an up position for docking rather than down.

Figure 13:
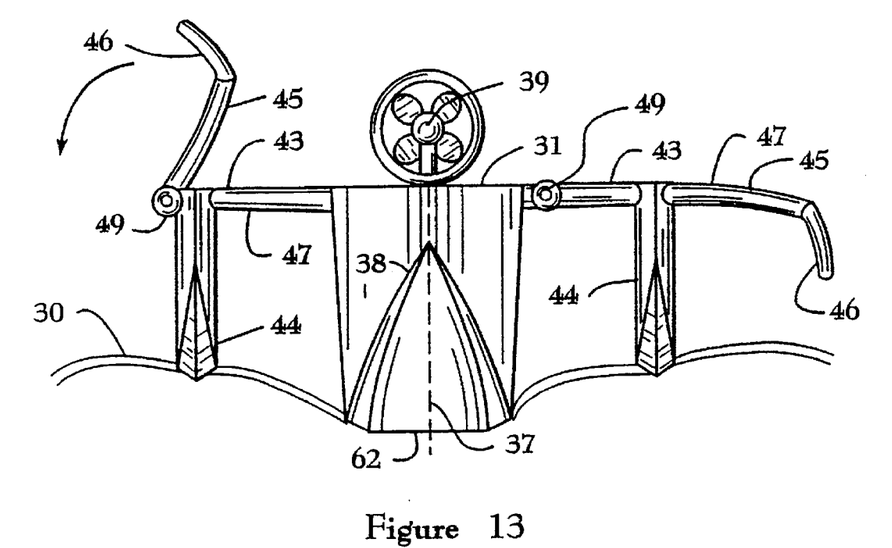
FIG. 13 is a bow view of a SeaLance with winglets added for additional aerodynamic lift. Note the starboard winglet is folded for docking in this instance.

FIG. 13 is a bow view of a SeaLance that has the addition of winglets 45 to further aid in generating aerodynamic lift. These winglets 45 also have wingcaps 46 here to aid in aerodynamic lift efficiency. The starboard winglet is retracted here to aid in close quarters waterborne maneuvering.

Figure 14:
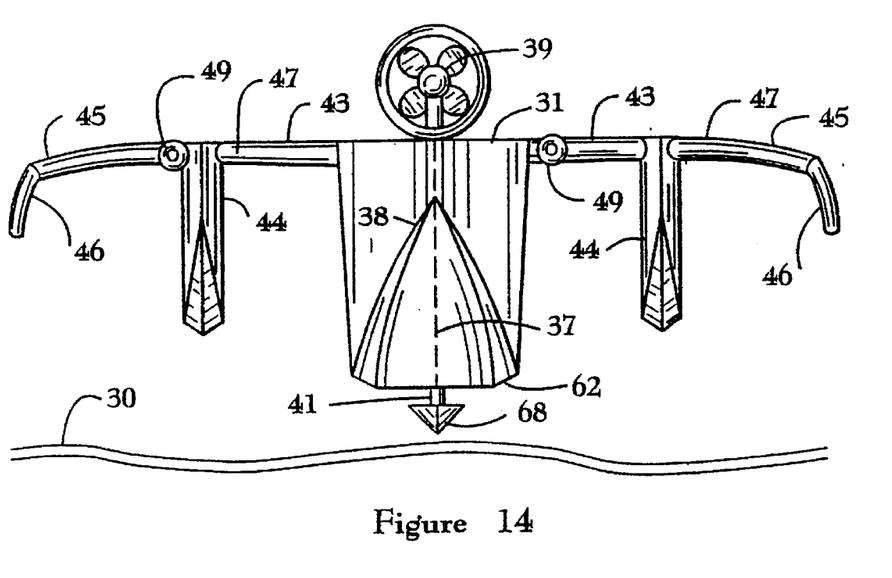
FIG. 14 shows a similar SeaLance to that shown in FIG. 13 but with all sidewings locked into position and the SeaLance airborne. Note the air propulsor and the water stabilizer in the form of a lifting body that is shaped like a small boat here.

FIG. 14 is a blow view of the same SeaLance as presented in FIG. 13 but with sidewings 47 totally locked into position and the SeaLance airborne. Note the air propulsor 39 which is preferred for airborne operation. Note also the water stabilizer 41 which in this case has a lifting body 68 that is heat shaped to aid in takeoffs and landings.

While the invention has been described in connection with a preferred and several alternative embodiments, it will be understood that there is no intention to thereby limit the invention. On the contrary, there is intended to be covered all alternatives, modifications and equivalents as may be included within the spirit and scope of the invention as defined by the appended claims, which are the sold definition of the invention.

What I claim is:

1. In an improved marine vehicle that is at least partially supported when waterborne by an artificially pressurized gas cushion with said gas cushion supplied with gas by at least one gas pressurization means, the improvement comprising: said artifically pressurized gas cushion at least partially disposed in an open bottomed recess in a main hull of said marine vehicle with boundaries of said open bottomed recess at least partially defined by substantially rigid water contacting sidekeels and a recess aft seal and where, as seen in a calm sea surface waterline with the gas cushion pressurized and the marine vehicle waterborne and moving forward at high speed, the main hull is substantially boat shaped with a narrow bow forward that then diverges, by way of the substantially rigid water contacting sidekeels, and with said sidekeels becoming more parallel over their aft portions and wherein an average total divergence angle of said water contacting sidekeels, as measured from the narrow bow to where the sidekeels become more parallel over their aft portions, is on average less than twenty-two degrees and where each of said sidekeels diverges over a minimum of one third of its water contacting length going aft from the narrow bow; and which further comprises outrigger hulls disposed either side of the main hull with mechanical communication of said outrigger hulls with the main hull including outrigger wings.

2. The improved marine vehicle of claim 1 wherein an average total divergence angle of the substantially rigid water contacting sidekeels, as measured from the narrow bow to where the sidekeels become more parallel over their aft portions, is less than eighteen degrees.

3. The improved marine vehicle of claim 1 which further comprises a water stabilizer wherein said water stabilizer can at least partially retract into the open bottomed gas cushion recess in the main hull and wherein when said water stabilizer is extended to a lowered position it extends substantially below the sidekeels.

4. The improved marine vehicle of claim 3 wherein the water stabilizer has an inverted-T shape with a single vertically oriented strut and with a lower portion of the Inverted-T shape comprising at least in part, a hydrofoil.

5. The improved marine vehicle of claim 3 wherein the water stabilizer has, at least in part, a boat like shape.

6. The improved marine vehicle of claim 1 wherein said outrigger hulls are retractable.

7. The improved marine vehicle of claim 1 which further comprises winglets disposed, at least in their majority, outboard of the outrigger hulls.

8. The improved marine vehicle of claim 7 wherein said winglets are in mechanical communication with wingcaps that are disposed proximal to and, in their majority, lower than the winglets when the winglets are in their full extension outboard orientation.

9. The improved marine vehicle of claim 1 wherein said outrigger wings individually extend outward beyond the main hull by at least sixty percent of a width of the main hull.

10. The improved marine vehicle of claim 1 which further comprises multiple vertically oriented water deflecting sidesteps in a side surface of the main hull and with at least one of said sidesteps extending upward from proximal a lower portion of a sidekeel to proximal a height of an upper surface of the gas cushion restraining open bottomed recess in the main hull.

11. The improved marine vehicle of claim 1 which further comprises at least one recess intermediate seal wherein said intermediate seal is, over a majority of its width as seen in a vertical transverse plane of the main hull, angled to horizontal.

12. The improved marine vehicle of claim 1 wherein the recess aft seal is, over a majority of its width as seen in a vertical transverse plane of the main hull, angled to horizontal.

13. The improved marine vehicle of claim 1 which further comprises labyrinth seals disposed in the recess aft seal.

14. The improved marine vehicle of claim 1 which further comprises a gas flow restricting means that can be applied to restrict gas flow by at least 90 percent from passing to atmosphere through a gas pressurization means and a separate gas pump capable of supplying gas to the gas cushion recess.

15. The improved marine vehicle of claim 1 which further comprises a gas flow restricting means that can be applied to restrict gas flow to atmosphere through a gas pressurization means and a separate gas pump capable of supplying gas to the gas cushion recess.

16. The improved marine vehicle of claim 1 wherein the narrow bow has a forward section that extends forwardly of a lower forward portion of the main hull.

17. In an improved marine vehicle that is at least partially supported when waterborne by an artifically pressurized gas cushion with said pressurized gas cushion supplied with gas by at least one gas pressurization means, the improvement comprising:

said pressurized gas cushion at least partially disposed in an open bottomed recess in a main hull of said marine vehicle with boundaries of said open bottomed recess, when the marine vehicle is waterborne, at least partially defined by substantially rigid water contacting sidekeels and a recess aft seal and where, as seen in a calm sea surface waterline with the gas cushion pressurized and the marine vehicle waterborne and moving forward at high speed, the main hull is substantially boat shaped with a narrow bow forward that then diverges, by way of the substantially rigid water contacting sidekeels, and with said sidekeels becoming more parallel over their aft portions and with outrigger hulls disposed either side of said main hull with said outrigger hulls in mechanical communication with the main hull by structure including outrigger wings and which further comprises a water stabilizer wherein said water stabilizer is capable of retracting, at least in its majority, into the gas cushion recess and, when in a lowered position, said water stabilizer extends substantially below the sidekeels.

18. The improved marine vehicle of claim 17 wherein said outrigger hulls are retractable to a position that is, at least in its majority, aft of a transom of said marine vehicle.

19. The improved marine vehicle of claim 17 wherein said outrigger hulls are retractable in a vertical direction.

20. In an improved marine vehicle that is at least partially supported when waterborne by an artificially pressurized gas cushion with said pressurized gas cushion supplied with gas by at least one gas pressurization means, the improvement comprising:

said artifically pressurized gas cushion at least partially disposed in an open bottomed recess in a main hull of said marine vehicle with boundaries of said open bottomed recess, when the marine vehicle is waterborne, at least partially defined by substantially rigid water contacting sidekeels and a recess aft seal wherein said recess aft seal, as seen in a vertical transverse plane of the main hull, is angled to horizontal over a majority of its width and where, as seen in a calm sea surface waterline with the gas cushion pressurized and the marine vehicle waterborne and moving forward at high speed, the main hull is substantially boat shaped with a narrow bow forward that then diverges, by way of the substantially rigid water contacting sidekeels, and which further comprises outrigger hulls disposed either side of said main hull with said outrigger hulls in mechanical communication with the main hull by structure including outrigger wings.

21. The improved marine vehicle of claim 20 which further comprises a recess intermediate seal wherein, as seen in a vertical transverse plane of the main hull, said recess intermediate seal is angled to horizontal over a majority of its width.

* * * * *